June 24, 1958 — R. C. DU BOIS — 2,840,096
PRESSURE DIVIDING APPARATUS
Filed April 14, 1955 — 4 Sheets-Sheet 1

INVENTOR.
Robert Clark Du Bois
BY Arthur H. Swanson
ATTORNEY.

June 24, 1958

R. C. DU BOIS 2,840,096

PRESSURE DIVIDING APPARATUS

Filed April 14, 1955

June 24, 1958  R. C. DU BOIS  2,840,096
PRESSURE DIVIDING APPARATUS
Filed April 14, 1955  4 Sheets-Sheet 3

INVENTOR.
Robert Clark Du Bois

BY Arthur H. Swanson

ATTORNEY.

United States Patent Office 2,840,096
Patented June 24, 1958

2,840,096

PRESSURE DIVIDING APPARATUS

Robert Clark Du Bois, Fairfield, Conn., assignor to Minneapolis-Honeywell Regulator Company, Minneapolis, Minn., a corporation of Delaware Application April 14, 1955, Serial No. 501,225

15 Claims. (Cl. 137—86)

A general object of the present invention is to provide a fluid restricting apparatus which will maintain a predetermined constant resistance to the flow of a fluid passing along two selectively variable restricted passages each having a flow port separate from a flow port in the other passage and having a common flow port.

More specifically, the present invention relates to a fluid restricting apparatus which when rotated with respect to two inlet ports and a common outlet port will provide a fluid pressure divider with at least two variably restricted passages arranged so that the pressure drop between one inlet port and the common outlet may be adjusted in a direction opposite the pressure drop between the other inlet and the common outlet.

In controllers of the commercially available elastic fluid pressure variety it is necessary to provide a plurality of separately adjustable restrictions in the flow lines passing between chambers of the controller. These restrictions provide a means of adjusting e. g. the reset, proportional band and rate control action of the controller. The job of adjusting each of these restrictions, so that a desired control action may be affected, is very tedious as it is ofttimes necessary to adjust the position of one of these restrictions in one manner while simultaneously altering the position of a second of these restrictions in another manner.

It is therefore another object of the present invention to employ the aforementioned restricting apparatus in a fluid passageway running between the postive feedback chamber, the negative feedback chamber and the output control signal passage of an elastic fluid pressure controller so as to provide a novel proportional band adjusting means for the controller which will facilitate the simultaneous adjustment of two variable restrictions.

Still another object of the invention is to employ a restricting apparatus for a fluid pressure controller in the aforesaid manner which when adjustably rotated will change the proportion of the output fluid control pressure that is administered to the negative feedback chamber without influencing the "lag," between the output fluid control pressure and the branch connected to the positive feedback chamber.

Still another object of the invention is to employ the aforementioned restricting apparatus in a control circuit of an elastic fluid pressure controller having a large volume positive feedback chamber acting as a pivot and a small volume negative feedback chamber so as to provide a restricting adjustment which will prevent immediate changes in positive feedback pressure from occurring when large step changes in the output pressure of the controller takes place due to e. g. an upset in the process being controlled by the controller.

The various features of novelty which characterize my invention are pointed out with particularity in the claims annexed to and forming a part of the specification. For a better understanding of the invention, however, its advantages and specific objects attained with its use, reference should be had to the accompanying drawings and descriptive matter in which I have illustrated and described preferred embodiments of the invention.

Of the drawings.

Unless otherwise noted, corresponding components shown in the various figures carry corresponding reference characters.

Figure 1:
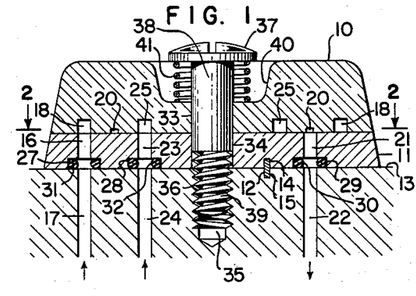
Fig. 1 shows a preferred form of pressure divider set out in this application, having two inlet ports and one outlet port.
Figure 2:
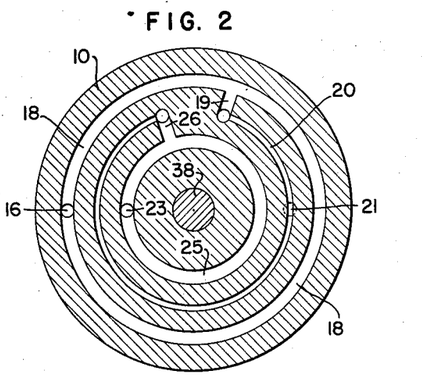
Fig. 2 is a sectional view taken on the section line 2—2 of Fig. 1.

In the embodiments shown in Figs. 1 and 2, the pressure divider may be comprised of a rotatable disc 10 and a base plate 11 rotatably fixed by a conventional locking pin means 12 to an immovable support 13. One end portion of the locking pin as shown thus fitted into a bored hole 14 in the base plate 11 and its other end shown inserted in a bored hole 15 in the support 13. A first passageway 16 in the base plate 11 is shown aligned with and opening into an inlet fluid supply passageway 17 in the support 13 at one end and shown connected and opening into a groove 18 of ring shaped configuration in the rotatable disc 10 at its other end. This groove 18 is machined to such dimensions that a fluid passing therethrough will not generally be restricted to any greater extent than it is when it is passing through passageway 16 and 17.

Although the dimension of the groove 18 is described as being of the same cross sectional area as the inlet passageway 17 it is not intended to preclude the use of other grooves of this type whose cross sectional area may be greater or less than their associated inlet passageway. Fig. 2 shows this groove 18 in concentric relationship with the center of the disc 10 and how this groove 18 is connected by means of a passageway 19 and a restricted passageway 20 to an outlet passageway 21. Aligned with the passageway 21 is a passageway 22 in the support 13 which can best be seen in Fig. 1.

A second inlet passageway 23 in the base plate 11 is shown aligned with and opening into another inlet fluid supply passageway 24 in the support 13 at one end and shown connected and opening into a groove 25, of a ring-shaped configuration, in the rotatable disc 10 at its other end. This groove 25 is machined to such dimensions that a fluid passing therethrough will not be restricted to any greater extent than it is when it is passing through passageways 24 and 23. Fig. 2 shows this groove 25 in concentric relationship with the center of the disc 10 and how this groove 25 is connected by means of a passageway 26 and the restricted passageway 20 to the outlet passageway 21.

The lower surface of base plate 11 is bored adjacent the passageway 16, 23 and 21 to form enlarged openings 27, 28, 29 into each of which a commercially available sealing material such as a rubber O-shaped ring 30, 31 or 32 shown in Fig. 1 may be inserted.

In Fig. 1 there is shown a reemed out aperture 33 in the central portion of disc 10. A second aperture 34 is also shown in the central portion of the base plate 11 which aperture is in alignment with the first aperture 33. Also in alignment with the first and second mentioned apertures is a bored out portion 35 having an internally threaded portion 36. Shown inserted in the aforementioned apertures 33, 34 and bored out portion 35 is a screw having a slotted head 37, a smooth cylindrical portion 38 and a threaded portion 39 in engagement with the internally threaded portion 36 of the bored hole 35.

In Fig. 1 the upper central portion of the disc 10 is shown with a recess 40 therein in order to support one end of a spring 41. The screw 37–39 is rotated so as to compress the spring 41 against a lower portion of the recess 40 so as to seat the disc 10 tightly against the base plate 11 so that the fluid will be restricted to the formed passageways.

The rotation of the disc 10 about the portion 38 affords means whereby the amount of restricted passageway 20, shown in Figs. 1 and 2 which lies between the first inlet passageway 16, the outlet passageway 21, can be increased or decreased while the amount of restricted passageway 20 between the second inlet passageway 23, the outlet 21 is respectively being decreased or increased. There is thus provided a fluid pressure divider comprising two simultaneously adjustable fluid resistance passages.

Figure 3:
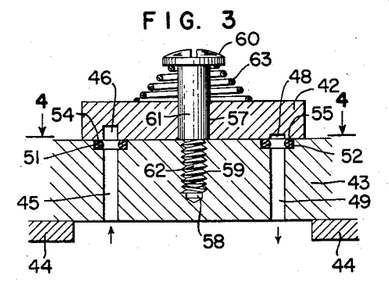
Fig. 3 shows a sectional view of another form of pressure divider set out in this application which is taken on the section line 3—3 of Fig. 4.
Figure 4:
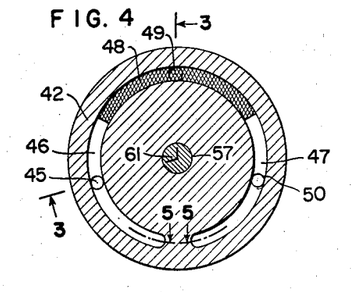
Fig. 4 is a sectional view taken on the section line 4—4 of Fig. 3.
Figure 5:
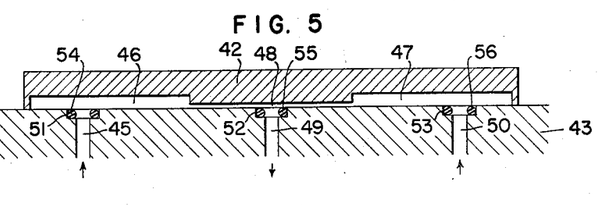
Fig. 5 is a developed sectional view taken on the section line 5—5 of Fig. 4.

A second form of the pressure divider is shown in Figs. 3–5 and comprises a rotatable disc 42 and a base plate 43 rotatably fixed to an immovable support 44. These figures show a first inlet passageway 45 in the base plate 43 shown connected to a groove 46, 47, 48 of circular horseshoe shape configuration in the lower surface of the disc 42. The portion of this passageway 48 shown in Fig. 4 is purposely shaded so that it may readily be identified as that portion of the groove 46–48 that has the least depth. The reference characters 46, 47 represent two portions of the groove which are machined to such dimensions that a fluid passing therethrough will not be restricted to any greater extent than it is when it is passing through the first inlet passageway 45. The left end portion of the restricted passageway 48 is shown, in Figs. 4 and 5, between the inlet passageway 45, the groove's end portion 46 and an outlet port 49. A second inlet passageway 50 is shown opening into the other end portion 47 of the groove 46, 47, 48 which groove in turn is connected to the right end portion of the restricted passageway 48. The restricted passageway 48 in turn is connected to the outlet port 49.

The upper surface of the base plate 43 is counterbored adjacent the inlet passageway 45, 49, 50 to form enlarged openings 51, 52 and 53 into each of which a commercially available sealing material such as O-shaped ring 54, 55, or 56, as shown in Fig. 5, may be inserted.

In Fig. 3, there is shown a reemed out aperture 57 in the central portion of the rotatable disc 42. In alignment with this aperture is a bored out portion 58 having an internally threaded portion 59. Inserted in the aforementioned aperture 57 is a screw having a slotted head 60, a smooth cylindrical portion 61 and a threaded portion 62 in engagement with the internally threaded portion 59 of the bored hole 58.

In Fig. 3 there is also shown a coil spring 63 wound in the form of a cone extending between the lower portion of the head of the screw 60 and the rotatable disc 42. The screw parts 60, 61, 62 are rotated so that the spring 63 is compressed against the upper surface of the disc 42 to seat the disc 42 against the base plate 43. The rotation of the disc 42 about the screw thus provides a means whereby the amount of restricted passageway 48 between the first inlet passageway 45 and outlet passageway 49 can be increased or decreased while the amount of restricted passageway 48 between the second inlet passageway 50 and the outlet 49 is respectively being decreased or increased. It should be noted that although in Fig. 3 the reference character 49 is referred to as an outlet passageway it may be used as an inlet passageway as shown and later disclosed under the description of Fig. 14.

Figure 6:
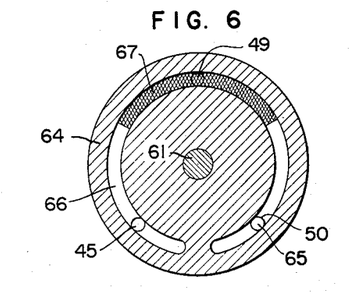
Fig. 6 shows a fluid pressure restricting apparatus having a single inlet port, an adjustable restriction and a single outlet.

Fig. 6 shows a single fluid pressure restricting device which may be mounted on a base plate by means of the screws 60, 61, 62, and spring arrangement 63 such as that shown in Fig. 3. This Fig. 6 shows a disc 64 having an inlet passageway 45 therein which may be the same type as that shown in the base plate 43 previously described. This inlet passageway 45 as shown in Fig. 6, is connected to a groove 66, 67 of circular horseshoe shaped configuration. The reference character 66 represents a portion of the groove that is machined to such dimensions that a fluid passing therethrough will not be restricted to any greater extent than it is when it is passing through the inlet passageway 45. The shaded portion represented by the reference character 67 shown in Fig. 6 represents a restricted passageway leading between the inlet passageway 45 and the unrestricted groove part 66 to the outlet port 49. It should be noted that in this case the inlet port 50 is sealed off with a suitable plug 65.

Rotation of the screw 60, 61, and 62 in one direction with respect to a base plate such as the base plate 43 in Fig. 3 will permit the spring 63 to be compressed against the upper surface of the disc 64, shown in Fig. 6 to seat the same. The rotation of the disc 64 about part 61 provides a means whereby the amount of restricted passageway 67 between the inlet port 45 shown in Fig. 6 and outlet passageway 49 in this same figure may be increased or decreased in a manner similar to that already described under Fig. 3.

Figure 7:
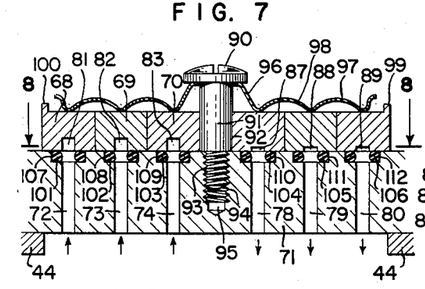
Fig. 7 shows a plurality of concentrically mounted pressure dividers each of which are similar to the pressure divider shown in Fig. 3.
Figure 8:
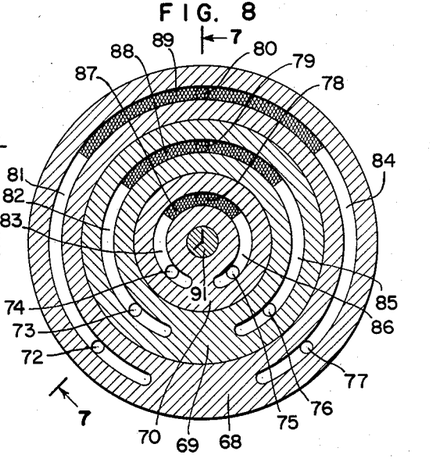
Fig. 8 is a sectional view taken on the section line 8—8 of Fig. 7.

Figs. 7 and 8 show how a plurality of concentric rotatable rings 68, 69, 70, which are each similar to the rotatable disc 42 shown in Fig. 3, may be joined together to form a single unit. This figure also shows a base plate 71 which is fixedly mounted to an immovable support 44 in the same manner as the base plate 43 shown in Fig. 3. Into this base plate is bored a plurality of inlet ports 72, 73, 74, 75, 76, and 77 and outlet ports 78, 79, and 80 which are similar to the inlet ports 45, 50 and outlet port 49 shown in Figs. 3 and 4. Each of these inlet ports 72–77 open into leg portions, 81, 82, 83, 84, 85, and 86 of grooves of circular horseshoe shaped configuration. Connecting the lower parts of the leg portions 83 and 86 there is shown a shaded portion 87 which is of a much shallower depth than either leg portion 83 or 86. Also, in a like manner, between the lower part of the leg portion 82 and 85 there is shown a shallow groove 88 and between the lower parts of the leg portion 81 and 84 there is shown a shallow groove 89.

Fig. 7 also shows a screw having a flat head 90, a smooth cylindrical portion 91 in rotatable contact with the internal diameter of the ring 70 and a threaded portion 93 threadedly engaging the threads in the bored out portion 95 of the base plate 71. This figure also shows a leaf spring 96 having a plurality of convolutions 97, 98 acting to bias the head of the screw 90 in an upward direction and to compress the rings 68, 69, and 70 in a downward direction against the base plate 71 to seat the rings in fluid sealing relation to the base plate 71. Each of the rings 68, 69, and 70 may carry positioning lugs, such as the lugs 99—100 shown on ring 68. These lugs may be used to rotate the individual rings to any desired position to provide the required pressure division in the respective rings.

The upper surface of the base plate 71 is shown bored at 101, 102, 103, 104, 105, and 106 adjacent the respective passageways 72, 73, 74, 78, 79, and 80 so as to accommodate their respective O-shaped rings 107, 108, 109, 110, 111 or 112. Although not shown in Figs. 7 or 8 holes may be similarly bored in the base plate 71 adjacent the inlet ports 75, 76, and 77 and an O-shaped ring placed therein in a manner identical to that already described.

With the arrangement shown in Figs. 7 and 8 there is provided a means for compacting three pressure dividing units into a single unitary device having three independent outlets 78, 79, and 80.

Figure 9:
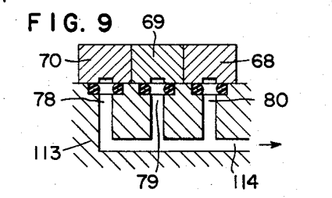
Fig. 9 shows how the outlet ports shown in Fig. 7 may be combined into a single outlet port.

Fig. 9 shows a base plate 113 which is identical to the base plate 71 shown in Fig. 7 except for the addition of passageway 114. This passageway 114 enables the output pressure of each of the dividers that flows through each of their respective passageways 78, 79, and 80 to be combined in the common passageway 114. In other words, the passageway 114 shown in Fig. 9 serves as a common outlet port for the three pressure dividers shown in Figs. 7 and 8.

Figure 10:
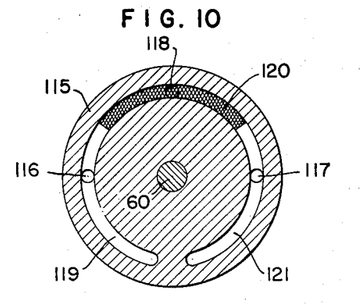
Fig. 10 shows a fluid pressure restricting apparatus having an inlet port, outlet port, and an exhaust port exhausting to the atmosphere.

Fig. 10 shows a single fluid pressure restricting device 115 which may be mounted on a base plate similar to the base plate 43 shown in Fig. 3 by means of a screw 61 and spring arrangement 63, also shown in Fig. 3. Fig. 10 shows a disc 115 having an inlet passageway 116 and exhaust port 117 exhausting to atmospheric pressure and an outlet passageway 118. Also shown in this figure is a groove of horseshoe configuration 119, 120, 121 which connects the inlet, outlet and exhaust ports 116, 118, and 117. The leg portions of this groove 119 and 121 are of the same cross sectional area as the inlet and outlet ports 116 and 117. The shaded groove part 120 connecting the two leg portions 119 and 121 is made shallow and of a much smaller cross sectional area than either of the inlet or exhaust ports 116, 117. With the arrangement shown in Fig. 10 the shallow portion of the groove 120 between the inlet and outlet ports 116 and 118 may be increased or decreased by rotation of the disc 15 in a manner similar to that already explained under Fig. 3. While such an increase or decrease in length of the shallow groove 120 occurs between the inlet 116 and outlet port 118 a corresponding decrease or increase in the length of this groove 120 will likewise occur between the port 117 exhausting to atmospheric pressure and the outlet 118. This apparatus is thus very useful in a pneumatic apparatus wherein it is desired to slowly or rapidly bleed a portion of an inlet pressure flowing between the inlet port 116 and outlet port 118 to atmospheric pressure.

Figure 11:
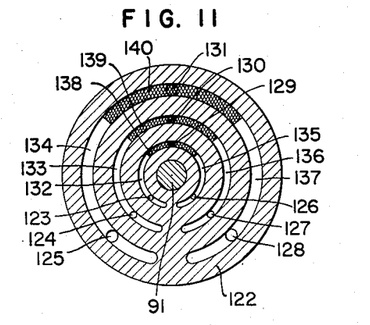
Fig. 11 is a sectional view of a unitary disc which may be used in lieu of the rings shown in Fig. 8 and which also shows each of the restricting grooves of a different width.

Fig. 11 shows a disc 122 which may be substituted for the rings 68, 69, and 70 shown in Fig. 8. This disc is similar to the Fig. 8 disclosure in that two inlet ports 123 and 126 are connected to an outlet port 129, a second set of inlet ports 124, 127 are connected to an outlet port 130 and a third set of inlet ports 125 and 128 are connected to an outlet port 131. Fig. 11 further differs from Fig. 8 in that the shaded groove connecting the first pair of inlet and outlet ports differs in width from the shaded groove connecting the second pair of inlet ports and the third pair of inlet ports with their respective outlet ports. The narrowest of these grooves is of circular horseshoe configuration having two leg portions 132 and 135, which are of the same cross sectional area as their respective inlet ports 123, and 126, and a shaded restricted portion 138 which is of a smaller cross sectional area than either of its associated leg portions 132, 135. The groove having the next largest width is likewise of circular horseshoe shape and has two leg portions 133, 136, which are of the same cross sectional area as the inlet ports 124, 127, and a shaded restriction portion 139 which is of a smaller cross sectional area than either of its associated leg portions 133, 136. The groove having the largest width is also of horseshoe shaped configuration and is comprised of two leg portions 134, 137 of a cross sectional area equal to the inlet ports 125, 128 and a shaded restricted portion 140 which is of a smaller cross sectional area than either of its associated leg portions 134, 137.

In the arrangement of Fig. 11, the rotation of disc 122 will produce the simultaneous adjustment of all of the restricted passages so that the device functions as a "ganged" pressure divider.

Figure 12:
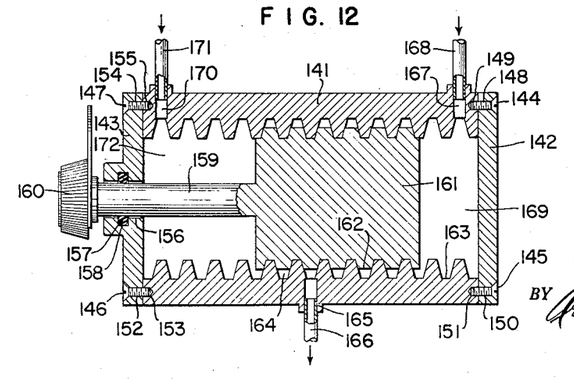
Fig. 12 shows still another form of pressure divider.

Fig. 12 shows an apparatus which enables a capillary restriction, between two inlet ports and an outlet port, to be adjusted with respect to the outlet port in a manner similar to that already explained under the description of Fig. 4. The capillary restricting means shown in Fig. 12 comprises a hollow cylindrically dished out block 141 enclosed by end plates 142 and 143. The ends 142, 143 of the block are joined to the body 141 by means of suitable screws such as the flat head machine screws 144, 145, 146, and 147. Fig. 12 shows how these screws may be mounted in the threaded parts 148–155 of the end plates and the body portions of the block. The end plate 143 is shown with a reemed out bored portion 156 and having a circumferential groove 158 to accommodate a suitable commercially available packing such as an O-ring packing 157. Mounted on this packing 157 and extending through the reemed out portion 156 in end plate 143 is a shaft 159. On the left end of this shaft is shown a rotatable indicating dial 160 which may be flexibly attached to the shaft 159 in any suitable fashion. The other end of the shaft 159 contains a capillary restricting means 161. The outer peripheral surface of this restricting means 161 contains a worm 162 threadedly engaged with threads 163 cut in the internal surface of the body part 141. The addendum of the worm 162 shown in Fig. 12 is made of such a dimension that there is a space 164 between the outermost peripheral surface of the worm and the base portion of the thread 163. The void area formed in this manner thus forms a spiral capillary or a restriction between either side of the restricting means 161. A bored hole 165 is bored through the wall of the body part 141 at a position slightly to the left of the center of the movable worm restricting means 161. This bored hole 165 acts as an outlet port for connecting the capillary 164 to any suitable outlet passageway 166. A second bored hole 167 is bored through the block body 141. This bored hole 167 provides a means for connecting a first fluid pressure input signal flowing through the passageway 168, to the right end portion 169 of the hollow block 141, 142, 143. A third bored hole 170 is bored through the block body 141. This bored hole 170 acts as an input port for connecting a variable fluid input pressure signal flowing through the input passageway 171, to the left end portion 172 of the dished out portion of the block 141, 142, 143. The showing in Fig. 12 indicates a position to which the restricting means 161 may be turned by rotation of the indicating dial 160 so as to obtain a greater length of capillary 164 between the input port 167 and output port 165 than is present between the input port 170 and output port 165.

Fig. 12 thus performs the same function as Fig. 4 but differs from Fig. 4 in that externally and internally threaded worm members are used to increase or decrease the length of capillary or restriction, between a first input port and an output port while the length of the capillary or restriction between a second input port and the output port is respectively decreased or increased.

For ease of consideration, the foregoing pressure dividers have been disclosed and described with certain inlet and outlet ports. It should be understood that the manner in which the pressure divider is utilized will determine which ports are to be used as inlet or outlet ports. The important feature is the fact that the present device is a pressure divider which provides at least two simultaneously adjustable resistance paths with fluid pressure connections at either end of the resistance paths and a connection at an intermediate point.

Figure 13:
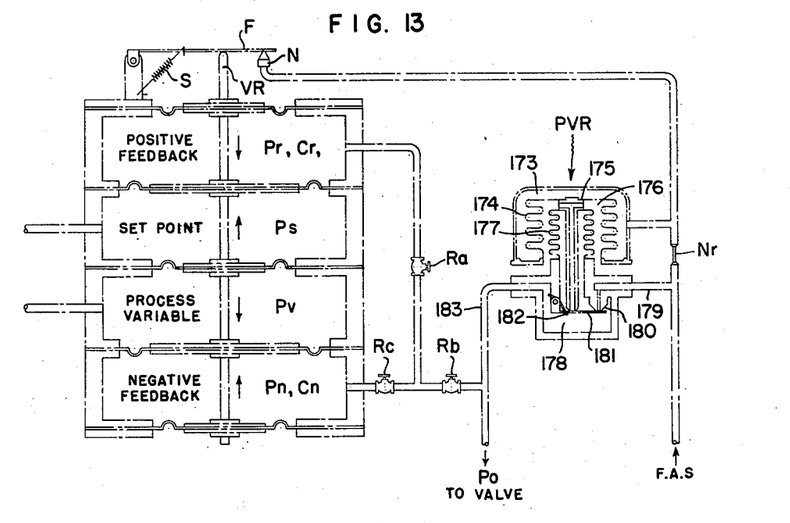
Fig. 13 shows a controller of the compressible fluid pressure regulated type as set out in Fig. 8 of the Harrison patent application, Serial No. 321,436, filed November 19, 1952, having two adjustable restrictions the adjustment of each of which will alter the reset rate and proportional band of the controller.

In Fig. 13 there is shown the previously mentioned Harrison type of an elastic-fluid-pressure-operated, industrial process controller in which a variable therein referred to is a measured, process, or control variable, which has been converted to an air pressure $Pv$, which is opposed to an air pressure $Ps$, which may be manually selected so as to be representative of the set point or that value of the control variable which the controller acts to maintain.

In this Harrison application the variable of the process under control to which it is desired to have the controller respond is measured by a suitable measuring element. This measuring element notes the changes or deviations in the controlled or measured variable from the set value determined by the set point adjusting means. Such a variable may be: temperature, pressure or differential pressure, flow, specific gravity, density, strain, chemical concentration, humidity, weight, position, and/or variations therein or any other variable for which a suitable measuring element exists. The measuring element may apply a force to the control-exercising element or may convert the instantaneous value of the measured or process variable into a variable pressure ($Pv$). The pressure $Pv$ is fed to a chamber in the controller, known as the process variable chamber, and is applied to the control-exercising means VR in opposition to the set point pressure $Ps$.

Harrison's controller is shown as comprising one or more motors which each applies a force to the flapper so as to move the flapper in the direction in which it has been moved by the measuring element or in the opposite direction.

In Fig. 13 there are four of these forces which are constituted by elastic fluid pressures. Pressure $Pv$ is applied to the third chamber of the controller, as shown. The chambers of this controller are numbered downward starting from the top of the sheet of drawing.

The second of these pressures is the set point pressure $Ps$, representing that value of the control variable which it is desired to have the controller maintain. Pressure $Ps$ is applied to the second chamber of the controller.

The third of these pressures is the follow-up or negative feedback $Pn$. This pressure acts in the opposite direction to the process variable. If the pressure $Pn$ is delayed in its application to the flapper F, a mode of operation known as rate action results. Pressure $Pn$ is applied to the fourth chamber of the controller.

The fourth of these pressures is the positive feedback $Pr$. This pressure acts in the same direction as the process variable. If the pressure $Pr$ is delayed in its application to flapper F, a mode of operation known as reset results. Pressure $Pr$ is applied to the first chamber of the controller.

Fig. 13 also shows the controller arranged for direct action, that is to say, the negative feedback pressure opposes the process variable pressure and the positive feedback pressure opposes the set point pressure.

The controller is in a balanced state, when $Pv=Ps$, the resultant force of the four above mentioned pressures on the flapper F equals zero and the controller is maintaining the controlled variable at its set value.

Any deviation of the process variable from its set value causes air pressure $Pv$ to vary. The resultant unbalance force actuates a valve, comprising a flapper F and a nozzle N, which controls a supply of air under pressure from a source of filtered air supply F. A. S. This controlled air pressure $Po$ is fed to a final control element, such as an air-operated diaphragm motor governing a final control valve.

The supply air from the source F. A. S. passes through a restriction $Nr$ to the nozzle N and also passes to the motor chamber 173 of a pilot valve relay, generally designated PVR. Motor chamber 173 has, as a wall thereof, a flexible bellows 174 connected at its central, top portion to a T-shaped, perforated, exhaust port 175 which leads to the space 176 between bellows 174 and a concentric, smaller, sealing bellows 177. Bellows 177 is also sealed to the T-shaped exhaust port 175 and forms a movable wall of a valve chamber, generally designated 178. The T-shaped exhaust port 175 leads from the interior of chamber 178 to the atmosphere between the bellows 174 and 177. A pipe 179 leads a supply of air from source F. A. S. to a nozzle 180 with which cooperates a flapper 181 biased by a spring 182 against nozzle 180 and the foot or lower end of T-shaped exhaust port 175. An outlet pipe 183 leads the controlled air pressure $Po$ from chamber 178 to an air-operated motor, such as diaphragm motor, which operates a final control element, such as a valve.

The controller throttling-range or proportional band adjustment comprises restrictions $Rb$ and $Ra$. The input side of restriction $Rb$ is connected to the pressure $Po$. The output side of restriction $Rb$ is connected to the fourth or negative feedback chamber and also to the input side of restriction $Ra$. The output side of restriction $Ra$ is connected to the first or positive feedback chamber.

Fig. 13 further shows a restriction $Rc$, which is interposed between the restriction $Rb$ and the fourth or negative feedback chamber containing the pressure $Pn$. Restriction $Rc$ is adjustable to give extra rate action to the controller.

Figure 14:
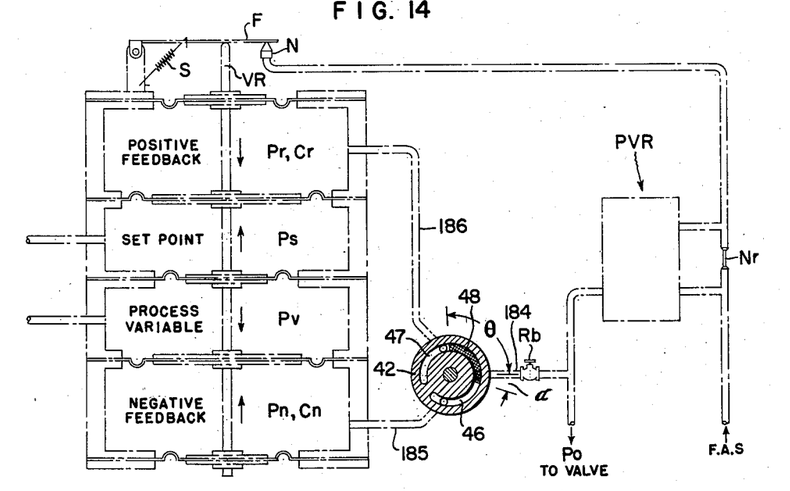
Fig. 14 shows how the pressure divider e. g. of the type as set out in Figs. 3–5 of this application may be substituted for the two adjustable restrictions of the aforesaid Harrison controller shown in Fig. 13.

Fig. 14 shows a controller and a controller circuit identical to that shown in Fig. 13 except that the pressure divider shown in Figs. 3–5 of the present application is being used as a restricting apparatus in lieu of the restrictions $Ra$ and $Rc$ shown in Fig. 13. One of the advantages of the present invention is that an operator is not required to simultaneously alter the position of two restrictions such as is required when using the adjustable restricting means $Ra$ and $Rb$ shown in Fig. 13 when making a new proportional band and reset rate controller setting.

It should be understood that the pressure divider shown in Figs. 1 and 2 or the pressure divider shown in Fig. 12 of this application could be used to the same equal advantage as the pressure divider 42 shown in Figs. 3 and 4.

Because the restrictions $Ra$ and $Rb$ of Fig. 13 must be independently adjusted at the same time to obtain the desired proportional band and reset rate setting, a considerable amount of time will be spent by the operator in making any particular desired band and reset rate setting for the controller shown in Fig. 13.

On the other hand, the controller shown in Fig. 14 which uses, for example, the pressure divider 42 as a restricting means can have its proportional band and reset rate adjusted by merely rotating the groove disc 42 to a predetermined position such as the position shown in Fig. 14.

After the fluid pressure to the control valve Po shown in Fig. 14 passes through the restriction Rb it passes through a passageway 184 into the restricted groove portion 48 of the restricting means 42. As this fluid pressure Po enters the restricting means 42 it flows in one direction through a small arcuate portion of the restricted groove alpha ($\alpha$) through passageway 185 to a negative feedback chamber and in another direction through a large arcuate portion of the restricting groove theta ($\theta$) through passageway 186 to a positive feedback chamber. The pressure divider 42 shown in Fig. 14 is thus used as a restricting means which when rotated to the position shown in this figure will cause one delay action on the control pressure Po that is being transmitted to the negative feedback chamber while it simultaneously produces a second and greater delay action on the control pressure Po that is being transmitted to the positive feedback chamber. The greater bias of the pressure in the negative feedback chamber resulting from this action will in turn tend to move the flapper F in an upward direction which latter change in turn will effect a change in the output pressure Po of the pilot valve PVR. This pilot valve action will cause the output pressure Po to lead the error signal created by the difference between the Ps and Pv pressures acting on the controller. Furthermore, it is thus evident that only one setting of the restricting means 42 will be required to purposefully cause the Po pressure to lead the error signal and thus prevent a step change in the process variable pressure Pv from distorting the control action of the controller on the control valve.

The restricting means 42 shown in Fig. 14 has the added advantage over Fig. 13 in that it can simultaneously adjust the rate and reset control settings of the controller in lieu of requiring separate adjustments as is necessary with the control apparatus shown in Fig. 13. A rate change in the control apparatus of Fig. 14 is brought about by changing the negative feedback bias. This is accomplished by reducing the portion $\alpha$ of the restricted groove portion 48 to a small amount as shown in this figure. While the value of the restricted groove portion $\alpha$ is reduced to the minimum value shown in Fig. 14 the restricted groove portion $\theta$ is increased. This last mentioned action will result in a delay of the control pressure Po that is being delivered to the positive feedback chamber which will cause a reset change.

Figure 15:
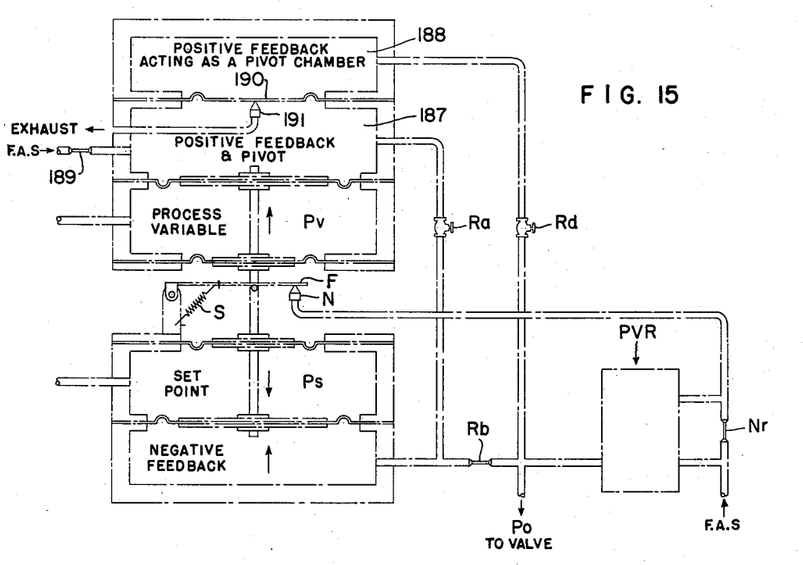
Fig. 15 shows another controller of the compressible fluid pressure regulated type as set out in Fig. 12 of the Harrison patent application, Serial No. 321,436, filed November 19, 1952, wherein there is shown an adjustable proportional band restricting means to alter the reset rate of the controller.

Fig. 15 shows a controller in which the proportional band adjustment includes a relay. This relay has a chamber 187 normally closed to atmospheric pressure but containing a source of fluid supply and an exhaust, this exhaust being under the control of the positive feedback control pressure in chamber 188. The output pressure Po of the pilot valve or relay PVR is fed to the final control element or valve (not shown). The output pressure Po is also fed through restriction Rd to a positive feedback control pressure chamber 188. This latter mentioned chamber is always closed to atmosphere. Fluid from a source of fluid supply F. A. S. is fed through an input restriction 189 to the positive feedback and pivot chamber 187. This chamber also contains an exhaust nozzle 190. Nozzle 190 is normally partially closed by a diaphragm 191 which forms a movable wall between the positive feedback pressure chamber 187 and the positive feedback control pressure chamber 188. Output pressure Po is fed through restrictions Rb and Ra in series to positive feedback chamber 187. The pressure in chamber 187 also serves as pivot pressure.

Figure 16:
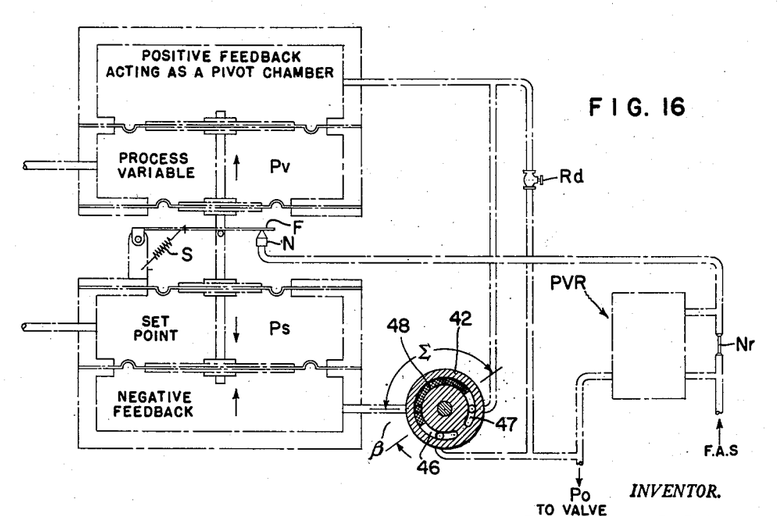
Fig. 16 shows how the pressure divider set out in this application may be substituted for the fixed and the adjustable proportional band restricting means shown in Fig. 15 so as to provide a means of adjusting the proportional band without it affecting the reset rate setting of the controller.

Fig. 16 shows a controller having a positive feedback chamber acting as a pivot chamber, a process variable chamber, a set point chamber and a negative feedback chamber which perform essentially the same function as these same chambers do as shown in Fig. 15. It will be noted that although Fig. 16 does not shown a positive feedback and pivot chamber this figure does procure the same control effect as Fig. 15 by making the positive feedback chamber of considerably larger volume than the negative feedback chamber. Since the Harrison application, Serial No. 321,436, filed November 19, 1952, also teaches the use of making one controller chamber of a greater volume than a second controller chamber, the controller shown in dot-dash lines in Fig. 16 is of the Harrison type of controller.

Whenever a change is made in the proportional band setting of the controller shown in Fig. 15, it will alter the effectiveness of the other control settings of the controller. For instance when the resistance Ra is increased or decreased the flow of a fluid pressure flowing from PVR to the positive feedback chamber will be respectively delayed or increased.

For example when it is desired that the controller shown in Fig. 15 be operated over a small portion of its total range, commonly referred to as a narrow band setting, Rb must be made large so as to maximize the flow of fluid to the negative feedback chamber and Ra must be wide open or of a negligible value. Such adjustments will thus provide the required relationship between the restriction Ra and Rb that is necessary to obtain a narrow band value from the band formula $Ra/Ra+Rb$.

Furthermore, in order to effect a narrow band control, a large flow of fluid supply F. A. S. must be fed into the positive feedback and pivot chamber 187. To accomplish this latter requirement the restriction 189 must be made of a relatively large cross-sectional area.

As a larger amount of fluid supply F. A. S. is fed into the positive feedback chamber and the negative feedback pressure is increased in this manner the diaphragm 190 will be moved in an upward direction and the bleed rate of the fluid supply exhausting through nozzle 191 to the atmosphere will be increased. One of the problems thus encountered in using a controller which has a positive feedback and pivot chamber, such as is shown in Fig. 15, is that a large portion of the fluid supply F. A. S. fed into this chamber must be exhausted from this chamber to atmosphere during normal operation of the controller.

Fig. 16 incorporates the pressure divider 42 similar to that shown in Figs. 3 and 4 of this application as a proportional band adjusting means with the Harrison type of controller similar to that shown in Fig. 15 as previously described. The net restriction between the positive feed back chamber and Po is not influenced by a $\beta$, $\Sigma$ setting change in the pressure divider 42. Therefore, like Fig. 15, there will be no appreciable interaction between proportional band and reset rate.

When the output pressure Po for example is reduced one pound and the divider 42 is rotated to the position shown in Fig. 16 the pressure in the negative feedback chamber will not realize the full one pound pressure drop but rather only a predetermined portion of that drop. This drop in pressure will thus be allowed to occur without varying the lag between the output pressure Po and the positive feedback pressure. This is possible because the net restriction of $\beta+\Sigma$ of the pressure divider 42 is a constant. Furthermore, when such a change in the output pressure Po does occur no immediate change in pressure in the positive feedback chamber will take place because of the negligible flow of fluid to this chamber which is of relatively large volume.

The rotation of restricting means 42 shown in Fig. 16 consisting of the arcuate restricting portions sigma ($\Sigma$) and beta ($\beta$) thus provide a more sensitive control action when operating on wide band setting than that afforded by the restricting means Ra and Rb shown in Fig. 15. This is possible with the Fig. 16 arrangement because the predetermined relationship which exists between the reset, rate, and proportional band setting restricting means are not changed upon rotation of restricting means 42.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. A pressure divider comprising a base plate, two spaced ports in said plate, a disc having one of its flat faces in rotatable contact with the upper surface of said base plate, a means for biasing said contacting surfaces into close proximity with one another, a groove of circular horseshoe configuration in the said contacting surface of said disc, the end portions of said groove being of a much greater depth than the remaining portion of said groove, one of said end portions of said groove being aligned with one of said two ports and the other of said end portions being aligned with the other of said two ports, and a third port in said plate in alignment with said remaining portion of said groove.

2. A means of selecting and maintaining a constant resistance to the flow of a fluid passing through a variable restricting means comprising, a base plate, an inlet and outlet port in said plate, a disc, a spring means for retaining one of the faces of said disc in slidable contact with the upper face of said plate, a substantially circular horseshoe shaped groove in the said contacting surface of said disc, means for retaining said goove in continuous rotatable alignment with said inlet and outlet ports, said portion of said groove covering and adjacent to either side of said outlet port being of a much greater reduced cross section area than said remaining portion of said groove covering the other of said ports and means for varying the length of the groove of smaller cross section existing between the inlet and outlet ports.

3. A means for combining and maintaining a constant resistance to the flow of two fluids passing through a variable restricting means comprising, two members, two fluid inlet ports and a fluid outlet port in one of said members, a groove of circular horse shoe configuration in said other member for providing a means of transmitting each of said two fluids from their associated inlet ports to said outlet port, said groove being of a much shallower configuration at a portion covering and on each side of said outlet port than the remaining portion of said groove, means for biasing said members in close proximity with one another and means for rotating one member with respect to the other so that the length of said shallow portion of the groove between one of the inlet ports and said outlet port is being decreased while the length of the shallow portion of the groove between the other of said inlet ports and said outlet port is being increased.

4. A means of selecting and maintaining a constant resistance on a flow of a fluid comprising, a base plate, an inlet, outlet and exhaust port in said plate, a disc, a spring means for retaining one of the faces of said disc in slidable contact with the upper face of said plate, a circular horseshoe shaped groove in the contacting surface of said disc, means for retaining said groove in rotatable alignment with each of said ports, said inlet port being aligned with one of the end portions of the groove and the exhaust port being aligned with the other end portion of said groove, said outlet port being aligned with the remaining portion of the groove between said end portions, said remaining portion being of much shallower depth than said end portions, and a rotatable means for increasing or decreasing the length of the shallow portion of the groove between the inlet and outlet port while the shallow portion of the groove between the outlet and exhaust port is respectively being decreased or increased.

5. A pressure divider for selecting and maintaining a constant resistance on any two of a plurality of input fluid pressures flowing from two separate inlet ports through an outlet port comprising, a plurality of ring members, each of said ring members having a circular horseshoe shaped groove on one of its flat faces, a second member in contact with each of said faces of said ring members, said second member having two inlet ports rotatably aligned with each of the end portions of each of said grooves and an outlet port rotatably aligned with the remaining portion of said grooves, means for retaining each of said ring members in contact with said second member, said remaining portion of each of said grooves being of shallower configuration than said end portions, a rotatable means for increasing the length of the shallow portion of the groove in each ring between one of its said aligned inlet and outlet ports while the length of the shallow portion of the groove between the other coacting inlet and said outlet port is decreased.

6. A pressure divider for selecting and maintaining a constant resistance on any two of a plurality of input fluid pressures flowing from two separate inlet ports through a common outlet port comprising, a plurality of ring members, each of said ring members having a circular horseshoe shaped groove on one of its flat faces, a second member in contact with each of said faces of said ring members, said second member having pairs of inlet ports rotatably aligned with each of said end portions of each of said grooves and an outlet port rotatably aligned with each of the remaining portions of said grooves, means for retaining each of said ring members in contact with said second member, said remaining portion of each of said grooves being of shallower configuration than said end portions, a rotatable means for decreasing the length of the shallow portion of the groove in each ring between one of said pair of inlet ports and said common outlet port while the shallow portion of the groove between said other of said pair of inlet ports and said outlet port is increased, and passageways in each of said second members connecting said outlet port in each of said second members with a common outlet port in said second member.

7. A pressure divider for selecting and maintaining a constant resistance and bleed on fluids flowing between inlet and outlet ports comprising, a first disc, a plurality of concentric horseshoe shaped grooves in said disc, said first disc being rotatably mounted on a second disc, a plurality of input ports in said second disc, one leg portion of each of said grooves being in alignment and opening into each of said input ports, each of the remaining legs of said grooves opening into and being aligned with a single atmospheric exhaust port in said second disc, said remaining portion of said groove between said leg portions of each of said grooves being of a very shallow configuration, a means for retaining said first disc in close proximity to said second disc and an additional means for rotating said disc and its associated groove with respect to said second disc for varying the length of the shallow groove existing between each of said inlet ports and an associated outlet port in said disc while varying the length of the shallow groove existing between the exhaust ports and said outlet port.

8. A pressure divider, a block having an elongated dished out central portion, two spaced pressure inlet passageways connected and opening into said dished out portion, an outlet pressure passageway in said block at a location between each of said inlet passageways, a capillary restricting means covering and on each side of the portion of the outlet passageway that opens into said dished out portion and means for displacing the capillary relative to said inlet ports so as to increase the length of the restriction between one of said inlet ports while decreasing it between the other of said inlet ports and vice versa.

9. A pressure dividing means for altering the fluid pressure in a negative feedback chamber of an elastic-fluid-pressure-actuated controller without varying the lag between the controller's output control pressure and the pressure in a positive feedback chamber of said controller during sudden changes in the magnitude of an input fluid pressure acting on said controller comprising, two members, one of said members having a first port connected to the output control pressure of said controller, a port connected to said positive feedback chamber of said controller on one side of said first port and a port connected to said negative feedback chamber on the other side of said first port, said other member having a groove of circular horseshoe configuration in rotatable alignment with said ports on one of its faces, a means for rotating said other member with respect to said first mentioned member, said groove having a shallow restricting portion between the lower portion of the legs of the groove covering and on each side of said first port, means for biasing said members in close proximity with one another, said rotating member being operable to reduce the amount of shallow restriction between said first port and said port in said member connected to the negative feedback chamber while simultaneously increasing the amount of shallow restriction between said first port and said port connected to the positive feedback chamber.

10. An adjustable restricting means for varying the proportional band of an elastic-fluid-pressure actuated controller without affecting the reset rate setting of said controller comprising two members, one of said members having a first port connected to a negative feedback chamber of said controller, a second port connected to a large positive feedback chamber of said controller and a third port connected to the output control pressure of said controller, said other member having a groove of horseshoe configuration in rotatable alignment with said ports on one of its faces, a means of rotating said other member with respect to the first mentioned member, said groove having a shallow restricting portion between the lower portion of the legs of the groove covering and on each side of said first port, means for biasing said members in close proximity with one another, said rotating member being operable to reduce the amount of shallow restriction between said third port and said first port connected to said negative feedback chamber while increasing the amount of shallow restriction between said first port and said second port connected to said large positive feedback chamber.

11. A pressure divider comprising a base plate, two spaced inlet ports in said plate, a disc having one of its flat faces in rotatable contact with the upper surface of said base plate, a means for biasing said contacting surfaces into close proximity with one another, a groove in the said contacting surface of said disc, a capillary forming a central portion of said groove, one of said non-capillary portions of said groove being aligned with one of said inlet ports and the other of said non-capillary portions of said groove being aligned with the other of said inlet ports, and an outlet port in said plate in alignment with said remaining capillary portion of said groove.

12. A pressure divider for selecting and maintaining a constant resistance on any two of a plurality of input fluid pressures flowing from two separate inlet ports through an outlet port comprising, a disc, said disc having a plurality of circumferentially spaced horseshoe shaped grooves on one of its flat faces, said width of said grooves being varied from a minimum width for the groove nearest the center of said disc to a maximum for the groove farthest from the center of said disc, a member in contact with said face of said disc, said member having two inlet ports rotatably aligned with each of said leg portions of said grooves and an outlet port rotatably aligned with each of said non leg portions of said grooves, means for retaining said grooved surface of said disc in contact with said member, said non leg portion of each of said grooves being of shallower configuration than said leg portions, a rotatable means for increasing the length of the shallow portion of each groove in said disc between one of said aligned inlet and outlet ports while the length of the shallow portion of the groove between the other coacting inlet and said outlet port is decreased.

13. A pressure divider, a block having two end portions and a hollow cylindrical central portion, two pressure passageways passing through said central portion spaced from each other and from said end portions, a third passageway passing through said hollow cylindrical portion and between said two passageways, a screw thread on the inside surface of said central portion, an undercut screw means rotatably mounted in one of said end portions, said means having a threaded portion in engagement with the portion of said screw thread between said first two passageways, said screw when rotated acting to diminish the number of threads of said threaded portion existing between one of the said two passageways and said third passageway while the number of threads of said threaded portion existing between the other of said two passageways and said third passageway is increased.

14. A pressure divider, comprising a fixed member containing three pressure passageways therein, a second member containing a capillary, said second member being operably connected to said first member so as to affect movement of its capillary along a path between said three pressure passageways, said movement of said capillary acting to increase or reduce the length of capillary existing between one of said passageways and a second passageway while it simultaneously reduces or increases the length of capillary existing between one of said last two mentioned passageways and a third passageway of said three passageways.

15. A pressure divider for selecting and maintaining a constant resistance on any two of a plurality of input fluid pressures flowing from two separate inlet ports through an outlet port comprising, a plurality of ring members, each of said ring members having a circular horseshoe shaped groove on one of its flat faces, a second member in contact with each of said faces of said ring members, said second member having two inlet ports rotatably aligned with each of the end portions of each of said grooves and an outlet port rotatably aligned with the remaining portion of said grooves, means for retaining each of said ring members in contact with said second member, said remaining portion of each of said grooves being of shallower configuration than said end portions, a means operably connected to each of said ring members for independently increasing the length of the shallow portion of the groove in any one of said ring members between its aligned inlet and outlet ports while the length of the shallow portion of the groove between its other coacting inlet and the said outlet port is decreased.

References Cited in the file of this patent

UNITED STATES PATENTS

| | | |
|---|---|---|
| 1,964,300 | Perry et al. | June 26, 1934 |
| 1,983,213 | Brady et al. | Dec. 4, 1934 |
| 2,236,084 | Brown | Mar. 25, 1941 |
| 2,447,920 | Terry | Aug. 24, 1948 |
| 2,512,561 | Ziegler | June 20, 1950 |

FOREIGN PATENTS

| | | |
|---|---|---|
| 1,028,767 | France | Mar. 4, 1953 |
| 1,071,770 | France | Mar. 10, 1954 |